(12) United States Patent
Czaplicki et al.

(10) Patent No.: US 8,580,058 B2
(45) Date of Patent: Nov. 12, 2013

(54) STRUCTURALLY REINFORCED MEMBERS

(75) Inventors: Michael J. Czaplicki, Rochester, MI (US); David Carlson, Rochester Hills, MI (US)

(73) Assignee: Zephyros, Inc., Romeo, MI (US)

( * ) Notice: Subject to any disclaimer, the term of this patent is extended or adjusted under 35 U.S.C. 154(b) by 899 days.

(21) Appl. No.: 11/944,075

(22) Filed: Nov. 21, 2007

(65) Prior Publication Data
US 2008/0061602 A1  Mar. 13, 2008

Related U.S. Application Data

(63) Continuation of application No. 10/337,446, filed on Jan. 7, 2003, now Pat. No. 7,318,873.

(60) Provisional application No. 60/369,039, filed on Mar. 29, 2002.

(51) Int. Cl.
*B29C 65/00*  (2006.01)

(52) U.S. Cl.
USPC ......... 156/78; 156/79; 156/293; 264/42; 264/43; 264/44; 264/45.1; 264/45.5; 264/46.4; 264/46.6; 264/46.7

(58) Field of Classification Search
USPC ........ 156/77–79, 293; 264/42–44, 45.1, 45.5, 264/46.6, 46.7, 46.4
See application file for complete search history.

(56) References Cited

U.S. PATENT DOCUMENTS

| | | |
|---|---|---|
| 3,868,796 A | 3/1975 | Bush |
| 4,083,384 A | 4/1978 | Horne et al. |
| 4,378,395 A | 3/1983 | Asoshina et al. |
| 4,399,174 A | 8/1983 | Tanaka et al. |
| 4,444,818 A | 4/1984 | Tominaga et al. |
| 4,451,518 A | 5/1984 | Miura et al. |
| 4,463,870 A | 8/1984 | Coburn, Jr. et al. |
| 4,476,183 A | 10/1984 | Holtrop et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,803,105 A | 2/1989 | Kretow et al. |
| 4,810,548 A | 3/1989 | Ligon, Sr. et al. |
| 4,812,368 A | 3/1989 | Scherzer |
| 4,813,690 A | 3/1989 | Coburn, Jr. |
| 4,836,516 A | 6/1989 | Wycech |

(Continued)

FOREIGN PATENT DOCUMENTS

| | | |
|---|---|---|
| DE | 42 26 988 A1 | 2/1994 |
| DE | 19720109 A1 | 11/1997 |

(Continued)

OTHER PUBLICATIONS

Born et al., Structural Bonding in Automotive Applications.

(Continued)

*Primary Examiner* — Christopher Schatz (74) *Attorney, Agent, or Firm* — The Dobrusin Law Firm, PC (57) ABSTRACT

There is disclosed a reinforcement material for forming reinforced members. The reinforcement material includes a strengthening material which is preferably a fabric disposed at least partially between portions of matrix material.

18 Claims, 2 Drawing Sheets

(56) References Cited

U.S. PATENT DOCUMENTS

| | | | |
|---|---|---|---|
| 4,853,270 | A | 8/1989 | Wycech |
| 4,861,097 | A | 8/1989 | Wycech |
| 4,898,630 | A * | 2/1990 | Kitoh et al. .................. 156/79 |
| 4,901,500 | A | 2/1990 | Wycech |
| 4,908,930 | A | 3/1990 | Wycech |
| 4,922,596 | A | 5/1990 | Wycech |
| 4,923,902 | A | 5/1990 | Wycech |
| 4,978,562 | A | 12/1990 | Wycech |
| 4,995,545 | A | 2/1991 | Wycech |
| 5,124,186 | A | 6/1992 | Wycech |
| 5,266,133 | A | 11/1993 | Hanley et al. |
| 5,288,538 | A | 2/1994 | Spears |
| 5,358,397 | A | 10/1994 | Ligon et al. |
| 5,373,027 | A | 12/1994 | Hanley et al. |
| 5,474,721 | A | 12/1995 | Stevens |
| 5,506,025 | A | 4/1996 | Otto et al. |
| 5,529,824 | A | 6/1996 | Walendy et al. |
| 5,577,784 | A | 11/1996 | Nelson |
| 5,725,272 | A | 3/1998 | Jones |
| 5,755,486 | A * | 5/1998 | Wycech .................. 296/187.02 |
| 5,806,919 | A | 9/1998 | Davies |
| 5,851,626 | A | 12/1998 | McCorry et al. |
| 5,858,521 | A | 1/1999 | Okuda et al. |
| 5,866,052 | A | 2/1999 | Muramatsu |
| 5,888,600 | A | 3/1999 | Wycech |
| 5,892,187 | A | 4/1999 | Patrick |
| 5,894,071 | A | 4/1999 | Merz et al. |
| 5,902,656 | A | 5/1999 | Hwang |
| 5,904,024 | A | 5/1999 | Miwa |
| 5,985,435 | A | 11/1999 | Czaplicki et al. |
| 5,992,923 | A | 11/1999 | Wycech |
| 6,003,274 | A | 12/1999 | Wycech |
| 6,006,484 | A | 12/1999 | Geissbuhler |
| 6,030,701 | A | 2/2000 | Johnson et al. |
| 6,033,300 | A | 3/2000 | Schneider |
| 6,068,424 | A | 5/2000 | Wycech |
| 6,079,180 | A | 6/2000 | Wycech |
| 6,092,864 | A | 7/2000 | Wycech et al. |
| 6,096,403 | A | 8/2000 | Wycech |
| 6,099,948 | A | 8/2000 | Paver, Jr. |
| 6,103,341 | A | 8/2000 | Barz et al. |
| 6,103,784 | A | 8/2000 | Hilborn et al. |
| 6,114,004 | A | 9/2000 | Cydzik et al. |
| 6,131,897 | A | 10/2000 | Barz et al. |
| 6,135,541 | A | 10/2000 | Geise et al. |
| 6,149,227 | A | 11/2000 | Wycech |
| 6,150,428 | A | 11/2000 | Hanley, IV et al. |
| 6,165,588 | A | 12/2000 | Wycech |
| 6,168,226 | B1 | 1/2001 | Wycech |
| 6,189,953 | B1 | 2/2001 | Wycech |
| 6,196,621 | B1 | 3/2001 | VanAssche et al. |
| 6,197,403 | B1 | 3/2001 | Brown et al. |
| 6,199,940 | B1 | 3/2001 | Hopton et al. |
| 6,207,244 | B1 | 3/2001 | Hesch |
| 6,232,433 | B1 | 5/2001 | Narayan |
| 6,233,826 | B1 | 5/2001 | Wycech |
| 6,237,304 | B1 | 5/2001 | Wycech |
| 6,253,524 | B1 | 7/2001 | Hopton et al. |
| 6,263,635 | B1 | 7/2001 | Czaplicki |
| 6,267,436 | B1 | 7/2001 | Takahara |
| 6,270,600 | B1 | 8/2001 | Wycech |
| 6,272,809 | B1 | 8/2001 | Wycech |
| 6,276,105 | B1 | 8/2001 | Wycech |
| 6,281,260 | B1 | 8/2001 | Hanley, IV et al. |
| 6,287,666 | B1 | 9/2001 | Wycech |
| 6,296,298 | B1 | 10/2001 | Barz |
| 6,303,672 | B1 | 10/2001 | Papalos et al. |
| 6,305,136 | B1 | 10/2001 | Hopton et al. |
| 6,309,499 | B1 | 10/2001 | Mascia et al. |
| 6,309,985 | B1 | 10/2001 | Virnelson et al. |
| 6,311,452 | B1 | 11/2001 | Barz et al. |
| 6,315,938 | B1 | 11/2001 | Jandali |
| 6,319,964 | B1 | 11/2001 | Blank et al. |
| 6,321,793 | B1 | 11/2001 | Czaplicki et al. |
| 6,332,731 | B1 | 12/2001 | Wycech |
| 6,341,467 | B1 | 1/2002 | Wycech |
| 6,347,799 | B1 | 2/2002 | Williams et al. |
| 6,348,513 | B1 | 2/2002 | Hilborn et al. |
| 6,358,584 | B1 | 3/2002 | Czaplicki |
| 6,368,438 | B1 | 4/2002 | Chang et al. |
| 6,372,334 | B1 | 4/2002 | Wycech |
| D457,120 | S | 5/2002 | Broccardo et al. |
| 6,382,635 | B1 | 5/2002 | Fitzgerald |
| 6,383,610 | B1 | 5/2002 | Barz et al. |
| 6,389,775 | B1 | 5/2002 | Steiner et al. |
| 6,406,078 | B1 | 6/2002 | Wycech |
| 6,413,611 | B1 | 7/2002 | Roberts et al. |
| 6,419,305 | B1 | 7/2002 | Larsen |
| 6,422,575 | B1 | 7/2002 | Czaplicki et al. |
| H2047 | H | 9/2002 | Harrison et al. |
| 6,455,146 | B1 | 9/2002 | Fitzgerald |
| 6,467,834 | B1 | 10/2002 | Barz et al. |
| 6,471,285 | B1 | 10/2002 | Czaplicki et al. |
| 6,474,722 | B2 | 11/2002 | Barz |
| 6,474,723 | B2 | 11/2002 | Czaplicki et al. |
| 6,475,577 | B1 | 11/2002 | Hopton et al. |
| 6,482,486 | B1 | 11/2002 | Czaplicki et al. |
| 6,482,496 | B1 | 11/2002 | Wycech |
| 6,491,336 | B1 | 12/2002 | Beckmann et al. |
| 6,494,525 | B1 | 12/2002 | Blank |
| 6,502,821 | B2 | 1/2003 | Schneider |
| 6,519,854 | B2 | 2/2003 | Blank |
| 6,523,857 | B1 | 2/2003 | Hopton et al. |
| 6,523,884 | B2 | 2/2003 | Czaplicki et al. |
| 6,546,693 | B2 | 4/2003 | Wycech |
| 6,550,847 | B2 | 4/2003 | Honda et al. |
| 6,561,562 | B1 | 5/2003 | Hesch |
| 6,561,571 | B1 | 5/2003 | Brennecke |
| 6,573,309 | B1 | 6/2003 | Reitenbach et al. |
| 6,575,526 | B2 | 6/2003 | Czaplicki et al. |
| 6,592,174 | B1 | 7/2003 | Rollin et al. |
| 6,607,238 | B2 | 8/2003 | Barz |
| 6,607,831 | B2 | 8/2003 | Ho et al. |
| 6,619,009 | B2 | 9/2003 | Lupini et al. |
| 6,619,727 | B1 | 9/2003 | Barz et al. |
| 6,634,698 | B2 | 10/2003 | Kleino |
| 6,641,208 | B2 | 11/2003 | Czaplicki et al. |
| 6,668,457 | B1 | 12/2003 | Czaplicki |
| 6,676,793 | B2 | 1/2004 | Kobayashi et al. |
| 6,691,468 | B2 | 2/2004 | Helferty |
| 6,692,347 | B1 | 2/2004 | Schneider |
| 6,708,979 | B2 | 3/2004 | Stratman et al. |
| 6,729,425 | B2 | 5/2004 | Schneider |
| 6,748,667 | B2 | 6/2004 | Sevastian |
| 6,777,049 | B2 | 8/2004 | Sheldon et al. |
| 6,786,533 | B2 | 9/2004 | Bock et al. |
| 6,790,520 | B1 | 9/2004 | Todd et al. |
| 6,793,274 | B2 | 9/2004 | Riley et al. |
| 6,811,864 | B2 | 11/2004 | Czaplicki et al. |
| 6,820,923 | B1 | 11/2004 | Bock |
| 6,828,020 | B2 | 12/2004 | Fisher et al. |
| 6,846,559 | B2 | 1/2005 | Czaplicki et al. |
| 6,851,232 | B1 | 2/2005 | Schwegler |
| 6,855,652 | B2 | 2/2005 | Hable et al. |
| 6,887,914 | B2 | 5/2005 | Czaplicki et al. |
| 6,890,021 | B2 | 5/2005 | Bock et al. |
| 6,905,745 | B2 | 6/2005 | Sheldon et al. |
| 6,920,693 | B2 | 7/2005 | Hankins et al. |
| 6,921,130 | B2 | 7/2005 | Barz et al. |
| 6,923,499 | B2 | 8/2005 | Wieber et al. |
| 6,928,736 | B2 | 8/2005 | Czaplicki et al. |
| 6,932,421 | B2 | 8/2005 | Barz |
| 6,938,947 | B2 | 9/2005 | Barz et al. |
| 6,941,719 | B2 | 9/2005 | Busseuil et al. |
| 6,953,219 | B2 | 10/2005 | Lutz et al. |
| 6,955,593 | B2 | 10/2005 | Lewis et al. |
| 7,141,194 | B2 | 11/2006 | Beckmann |
| 2001/0022407 | A1 | 9/2001 | Beckmann |
| 2001/0042353 | A1 | 11/2001 | Honda et al. |
| 2002/0033618 | A1 | 3/2002 | Kwon |
| 2002/0053179 | A1 | 5/2002 | Wycech |
| 2002/0074827 | A1 | 6/2002 | Fitzgerald et al. |
| 2002/0096833 | A1 | 7/2002 | Czaplicki et al. |
| 2002/0174954 | A1 | 11/2002 | Busseuil et al. |

(56) References Cited

U.S. PATENT DOCUMENTS

| | | |
|---|---|---|
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0140671 A1 | 7/2003 | Lande et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0201572 A1 | 10/2003 | Coon et al. |
| 2003/0209921 A1 | 11/2003 | Coon et al. |
| 2003/0218019 A1 | 11/2003 | Le Gall et al. |
| 2004/0011282 A1 | 1/2004 | Myers et al. |
| 2004/0018341 A1 | 1/2004 | Richardson et al. |
| 2004/0018353 A1 | 1/2004 | Czaplicki et al. |
| 2004/0034982 A1 | 2/2004 | Wieber et al. |
| 2004/0036317 A1 | 2/2004 | Kleino |
| 2004/0046423 A1 | 3/2004 | Wieber |
| 2004/0056472 A1 | 3/2004 | Schneider |
| 2004/0058181 A1 | 3/2004 | Garnault et al. |
| 2004/0074150 A1 | 4/2004 | Wycech |
| 2004/0076831 A1 | 4/2004 | Hable et al. |
| 2004/0079478 A1 | 4/2004 | Merz |
| 2004/0084141 A1 | 5/2004 | Czaplicki |
| 2004/0112531 A1 | 6/2004 | Bogert et al. |
| 2004/0124553 A1 | 7/2004 | Czaplicki et al. |
| 2004/0135058 A1 | 7/2004 | Wycech |
| 2004/0143969 A1 | 7/2004 | Czaplicki |
| 2004/0212220 A1 | 10/2004 | Riley et al. |
| 2004/0217626 A1 | 11/2004 | Barz et al. |
| 2004/0227377 A1 | 11/2004 | Gray |
| 2004/0256888 A1 | 12/2004 | Le Gall et al. |
| 2004/0262810 A1 | 12/2004 | Barz et al. |
| 2004/0262853 A1 | 12/2004 | Larsen et al. |
| 2005/0012280 A1 | 1/2005 | Richardson |
| 2005/0016807 A1 | 1/2005 | Braymand |
| 2005/0017543 A1 | 1/2005 | Riley et al. |
| 2005/0058787 A1 | 3/2005 | Ishikawa et al. |
| 2005/0081383 A1 | 4/2005 | Kosal et al. |
| 2005/0082111 A1 | 4/2005 | Weber |
| 2005/0087899 A1 | 4/2005 | Coon et al. |
| 2005/0102815 A1 | 5/2005 | Larsen |
| 2005/0126286 A1 | 6/2005 | Hable et al. |
| 2005/0126848 A1 | 6/2005 | Siavoshai et al. |
| 2005/0127145 A1 | 6/2005 | Czaplicki et al. |
| 2005/0159531 A1 | 7/2005 | Ferng |
| 2005/0166532 A1 | 8/2005 | Barz |
| 2005/0172486 A1 | 8/2005 | Carlson et al. |
| 2005/0194706 A1 | 9/2005 | Kosal et al. |
| 2005/0212326 A1 | 9/2005 | Marion |
| 2005/0212332 A1 | 9/2005 | Sheldon et al. |
| 2005/0217785 A1 | 10/2005 | Hable et al. |
| 2005/0218697 A1 | 10/2005 | Barz et al. |
| 2005/0230165 A1 | 10/2005 | Thomas et al. |
| 2005/0241756 A1 | 11/2005 | Harthcock et al. |
| 2005/0251988 A1 | 11/2005 | Mendiboure |
| 2005/0260399 A1 | 11/2005 | Finerman |
| 2005/0268454 A1 | 12/2005 | White |
| 2005/0269840 A1 | 12/2005 | Finerman et al. |
| 2005/0276970 A1 | 12/2005 | Busseuil et al. |
| 2005/0285292 A1 | 12/2005 | Mendiboure et al. |
| 2006/0000186 A1 | 1/2006 | Carlson et al. |
| 2006/0006695 A1 | 1/2006 | Lutz et al. |
| 2006/0008615 A1 | 1/2006 | Muteau et al. |
| 2006/0019595 A1 | 1/2006 | Lewis et al. |
| 2006/0020076 A1 | 1/2006 | Finerman et al. |
| 2006/0021697 A1 | 2/2006 | Riley et al. |

FOREIGN PATENT DOCUMENTS

| | | |
|---|---|---|
| DE | 198 12 288 C1 | 5/1999 |
| DE | 198 56 255 C1 | 1/2000 |
| DE | 198 58 903 A | 6/2000 |
| EP | 0 061 131 | 9/1982 |
| EP | 0 236 291 A2 | 9/1987 |
| EP | 0 360 214 A2 | 3/1990 |
| EP | 0 611 778 A3 | 8/1994 |
| EP | 0 775 721 A1 | 5/1997 |
| EP | 0 891 918 A1 | 1/1999 |
| EP | 0 893 331 A1 | 1/1999 |
| EP | 0 893 332 A1 | 1/1999 |
| EP | 1 046 666 A1 | 10/2000 |
| EP | 1 072 647 A2 | 1/2001 |
| EP | 1 134 126 B1 | 3/2001 |
| EP | 1 122 156 A2 | 8/2001 |
| EP | 1 031 496 B1 | 12/2001 |
| EP | 0 893 332 B1 | 3/2002 |
| EP | 0 703 931 B1 | 10/2003 |
| EP | 1 359 004 | 11/2003 |
| EP | 1 362 683 A2 | 11/2003 |
| EP | 1 362 769 A1 | 11/2003 |
| EP | 1 428 744 | 6/2004 |
| EP | 1 134 314 B1 | 9/2004 |
| EP | 1 471 105 A2 | 10/2004 |
| EP | 1 475 295 A2 | 11/2004 |
| EP | 1 591 224 A1 | 2/2005 |
| EP | 1 351 787 B1 | 3/2005 |
| EP | 1 577 190 A1 | 9/2005 |
| EP | 1 157 916 B1 | 10/2005 |
| EP | 1 127 669 B1 | 4/2006 |
| FR | 2115177 | 7/1972 |
| FR | 2 749 263 | 12/1997 |
| GB | 2 061 196 A | 5/1981 |
| GB | 2 375 328 A | 11/2002 |
| JP | 406156317 A | 6/1994 |
| JP | 7-31569 | 7/1995 |
| JP | 2001/48055 | 2/2001 |
| JP | 2001-62833 | 3/2001 |
| JP | 02001191949 A | 7/2001 |
| JP | 2003-226261 | 8/2003 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/36243 | 7/1999 |
| WO | WO 99/48746 | 9/1999 |
| WO | WO 99/50057 | 10/1999 |
| WO | WO 99/61216 | 12/1999 |
| WO | WO 99/61281 | 12/1999 |
| WO | WO 00/12571 | 3/2000 |
| WO | WO 00/12595 | 3/2000 |
| WO | WO 00/13876 | 3/2000 |
| WO | WO 00/13958 | 3/2000 |
| WO | WO 00/20483 | 4/2000 |
| WO | WO 00/37243 | 6/2000 |
| WO | WO 00/37302 | 6/2000 |
| WO | WO 00/37554 | 6/2000 |
| WO | WO 00/39232 | 7/2000 |
| WO | WO 00/40629 | 7/2000 |
| WO | WO 00/40815 | 7/2000 |
| WO | WO 00/43254 | 7/2000 |
| WO | WO 00/46461 | 8/2000 |
| WO | WO 00/52086 | 9/2000 |
| WO | WO 00/55444 | 9/2000 |
| WO | WO 00/68041 | 11/2000 |
| WO | WO 01/10682 | 2/2001 |
| WO | WO 01/19667 A1 | 3/2001 |
| WO | WO 01/54936 | 8/2001 |
| WO | WO 01/56845 | 8/2001 |
| WO | WO 01/71225 | 9/2001 |
| WO | WO 01/83206 | 11/2001 |
| WO | WO 01/88033 | 11/2001 |
| WO | WO 03/042024 A1 | 5/2003 |
| WO | WO 03/051676 | 6/2003 |
| WO | WO 03/093387 A1 | 11/2003 |
| WO | WO 2005/044630 A1 | 5/2005 |
| WO | WO2005/077634 A2 | 8/2005 |
| WO | WO 2005/105405 | 11/2005 |
| WO | WO2005/113689 | 12/2005 |
| WO | WO2005/118735 | 12/2005 |

(56) References Cited

FOREIGN PATENT DOCUMENTS

OTHER PUBLICATIONS

Hopton et al., Application of a Structural Reinforcing Material to Improve Vehicle NVH Characteristics.
Lilley et al., Comparison of Preformed Acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
Klein et al., Application of Structural Foam in the Body in White.
Copending U.S. Appl. No. 09/459,756, filed Dec. 10, 1999.
Copending U.S. Appl. No. 09/631,211, filed Aug. 3, 2000.
Copending U.S. Appl. No. 09/655,965, filed Sep. 6, 2000.
Copending U.S. Appl. No. 09/858,939, filed May 16, 2001.
Copending U.S. Appl. No. 09/859,126, filed May 16, 2001.
Copending U.S. Appl. No. 09/974,017, filed Oct. 10, 2001.
Copending U.S. Appl. No. 09/676,725, filed Sep. 29, 2000.
Copending U.S. Appl. No. 10/163,894, filed Jun. 4, 2002.
Copending U.S. Appl. No. 09/939,152, filed Aug. 24, 2001.
Copending U.S. Appl. No. 10/233,919, filed Sep. 3, 2002.
Copending U.S. Appl. No. 10/234,902, filed Sep. 4, 2002.
Copending U.S. Appl. No. 10/236,315, filed Sep. 6, 2002.
Copending U.S. Appl. No. 10/008,505, filed Nov. 8, 2001.
Copending U.S. Appl. No. 10/008,194, filed Nov. 8, 2001.
Copending U.S. Appl. No. 10/342,025, filed Jan. 14, 2003.
Copending U.S. Appl. No. 10/339,112, filed Jan. 9, 2003.
Copending U.S. Appl. No. 10/098,952, filed Mar. 15, 2002.
Copending U.S. Appl. No. 10/103,029, filed Mar. 21, 2002.
Copending U.S. Appl. No. 10/293,511, filed Nov. 13, 2002.
Copending European Application Serial No. 0130439.3 filed Dec. 20, 2001.
Born et al., Structural Bonding in Automotive Applications, Apr. 2004.
Hopton et al., Application of a Structural Reinforcing Material to Improve Vehicle NVH Characteristics, Sep. 1999.
Lilley et al., Comparison of Preformed Acoustic Baffles and Two-Component Polyurethane Foams for Filling Body Cavities, Apr. 2001.
Lilley et al., A Comparison NVH Treatments for Vehicle Floorplain Applications, Apr. 2001.
Lilley et al., Vehicle Acoustic Solutions, May 2003.
Mansour et al., Optimal Bonding Thickness for Vehicle Stiffness, Apr. 2001.
Klein et al., Application of Structural Foam in the Body in White, 1997.

\* cited by examiner

STRUCTURALLY REINFORCED MEMBERS

CLAIM OF BENEFIT OF FILING DATE

This application is a continuation of copending application Ser. No. 10/337,446 filed on Jan. 7, 2003, which is a non-provisional of application No. 60/369,039 filed on Mar. 29, 2002, both of which are fully incorporated herein by reference for all purposes. Further, this application claims the benefit of the filing dates of both of these previous applications.

FIELD OF THE INVENTION

The present invention relates generally to a structurally reinforced member of an automotive vehicle or other article of manufacture, and more particularly to a member structurally reinforced with a reinforcement material wherein the reinforcement material includes a matrix material with one or more strengthening portions or layers integrated into the matrix material.

BACKGROUND OF THE INVENTION

For many years the transportation industry has been concerned with designing structural members and materials that provide reinforcement to targeted portions of the vehicle without significantly adding to the weight of a vehicle. At the same time, the size, shape, configuration or the like of these targeted portions can cause difficulties during the designing process. Thus, there is a need to provide materials, techniques and the like, which provide a desired amount of reinforcement to these targeted portions while minimally adding to the weight of these portions.

SUMMARY OF THE INVENTION

Accordingly, the present invention provides an improved structurally reinforced member and a method of forming the member. The reinforced member typically includes a member of an article of manufacture such as an automotive vehicle. The reinforced member also typically includes a reinforcement material formed of a plurality of portions of matrix material and one or more portions of strengthening material.

According to one preferred method, the reinforced member if formed by providing (e.g., co-extruding) at least two portions (e.g., layers) of matrix material. At least one portion (e.g., layer) of fibrous strengthening material is positioned at least partially between the at least two portions of matrix material thereby forming a reinforcement material. The reinforcement material preferably has a relatively small dimension that extends through each of the at least two portions of matrix material and through the portion of strengthening material. Preferably the strengthening material is no greater than about 30 weight percent of the reinforcement material, although it may be more. Further, according to the method, a member is provided and the member is preferably a component of an automotive vehicle having one or more surfaces defining an opening. The opening preferably has a relatively small dimension that is less than 10 millimeters greater than the relatively small dimension of the reinforcement material. The reinforcement material is preferably positioned within the opening of the member such that the dimension of the reinforcement material substantially aligns with the dimension of the opening of the member. It is also preferred that the reinforcement material be expanded, for example, to adhere the reinforcement material to the one or more surfaces of the member.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The invention relates to a reinforcement material for structurally reinforcing a member of an article, such as an automotive vehicle, a household or industrial appliance, furniture, storage containers or the like, and to a method of forming the member. More particularly, the present invention relates to a reinforcement material for forming reinforced members of an automotive vehicle wherein the reinforcement material may be applied to the member of the automotive vehicle, either with or without a carrier member for reinforcing the member of the automotive vehicle. Preferably, the reinforcement material has high strength and low weight. As used herein the term "member" or "reinforced member" may be a unitary or singular component or may be for a plurality of interconnected components.

Figure 1:
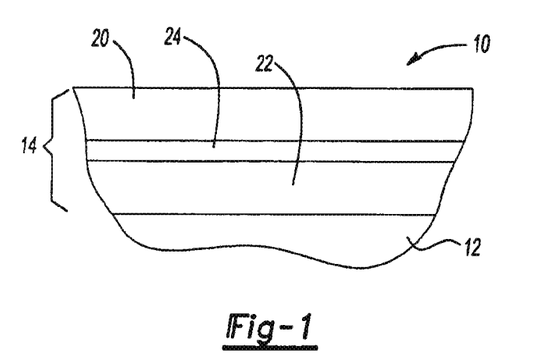
FIG. 1 is a sectional view of a reinforcement material applied to a member according to an exemplary aspect of the present invention.

Referring to FIG. 1, there is illustrated an exemplary embodiment of a structurally reinforced member 10 comprised of a member 12 having a reinforcement material 14 applied thereto. As shown, the reinforcement material 14 is comprised of a first portion 20, a second portion 22 and a third portion 24 between the first and second portions 20, 22. In FIG. 1, each of the portions 20, 22 and 24 are shown as layers, however, it is contemplated that the portions may be formed in various shapes and configurations.

The first and second portions 20, 22 are both formed of matrix material while the third portion 24 is formed of a strengthening material (e.g., a fabric material). The member 12 may be a component of an article of manufacture or it may be a carrier member that is to be applied to (e.g., inserted into a cavity of) a component of an article of manufacture. Thus, the reinforcement material 14 of the present invention may be applied directly to a surface of an article of manufacture or the reinforcement material 14 may applied to another member (e.g., the carrier member) and then applied to an article of manufacture. The reinforcement material may also be applied to or placed within an opening or cavity of a member without a carrier member.

Reinforcement Material

The reinforcement material 14 may be configured in a variety of shapes, designs, or thicknesses corresponding to the dimensions of the selected member 12 to which the reinforcement material is applied. Preferably, at least a portion of the reinforcement material is expandable, curable or both.

The third portion 24 of strengthening material may be chosen from a variety of materials. For example, and without limitation, the strengthening material may be formed of metal foils, metal sheets, metal screens or the like. As alternative examples, the strengthening material may be formed of polymeric (e.g., thermoplastic) films, sheets or mesh. In still other alternative embodiments, the strengthening material may be formed of cellulose fiber material such as impregnated or non-impregnated paper, wood or the like.

For certain applications, particularly automotive applications, it may be preferable for the strengthening material to be a filament, fibrous or fabric material, which may be applied as a mat, a cloth, a roving or the like. In such embodiments, the strengthening material may be composed of, for example, woven or unwoven strands, fibers, filaments or the like of cotton, fiberglass, nylon, carbon, aramid, plastics, polymers or other materials. In one highly preferred embodiment, the strengthening material is a fabric formed of fiberglass strands such as a weave or roving of fiberglass strands. The skilled artisan will recognize that, although preferred materials have been disclosed herein, various alternative materials may be chosen for the strengthening material depending upon the needed or desired properties or functionality for a particular application.

The first portion 20 and second portion 22 of matrix material are preferably selected so as to be activatible under a desired condition to soften (e.g, melt), expand, foam or otherwise change states such that the matrix material can wet, and preferably bond to adjacent surfaces (e.g., the surfaces provided by the portion 24 of strengthening material, the member 12 or a combination thereof). In one embodiment, the matrix material is also selected to cure during or after activation and, upon or after cure, form a relatively low density, low weight material with high strength characteristics such as high stiffness for imparting structural rigidity to a member. In a preferred embodiment, the matrix material has a post-cure glass transition temperature that is greater than any temperatures to which the matrix material may be exposed while in its intended environment of use (e.g., in an automotive vehicle). Exemplary glass transition temperatures may be greater than about 50 degrees Celsius and more preferably greater than about 70 degrees Celsius. Other desired characteristics of the matrix material might include good adhesion retention and degradation resistance particularly in the presence of corrosive or high humidity environments.

A number of structurally reinforcing matrix materials may be used to form the portions 20, 22. The matrix material may be a thermoplastic, a thermoset or a blend thereof and preferably includes a cross-linkable resin. According to one embodiment, the matrix material is an epoxy-based material, an ethylene-based polymer, or a mixture thereof, which when compounded with appropriate ingredients (typically a blowing agent, a curing agent, accelerators for the blowing agent and curing agent and perhaps a filler), typically expands and cures in a reliable and predictable manner upon the application of heat or another activation stimulus.

Thus, according to one embodiment, the matrix material is a heat-activated, epoxy-based resin having foamable characteristics upon activation through the use of heat typically encountered in an e-coat or other paint oven operation. Preferably, the epoxy matrix material is such that upon being heated, it structurally bonds to adjacent surfaces. From a chemical standpoint for a thermally-activated material, such matrix material is usually initially processed as a thermoplastic material before curing. After curing, the matrix material typically becomes a thermoset material that is fixed and incapable of any substantial flowing. Examples of preferred formulations that are commercially available include those available from L&L Products, Inc. of Romeo, Mich., under the designations L-5204, L-5206, L-5207, L-5208, L-5214, L-5222 and L-8000.

The matrix material may be formed using a variety of processing techniques, machines and the like. Possible processing techniques for the preferred materials include injection molding, blow molding, thermoforming, extrusion with a single or twin screw extruder or extrusion with a mini-applicator extruder. In a preferred embodiment, matrix material is extruded using a twin-screw extruder with the resulting portions 20, 22 having a substantially continuous thickness or a variable thickness.

Though preferred matrix materials are disclosed, other suitable art disclosed matrix material may be used in conjunction with the present invention. The choice of the matrix material used will be dictated by performance requirements and economics of the specific application and requirements. Examples of other possible matrix materials include, but are not limited to, polyolefin materials, copolymers and terpolymers with at one monomer type an alpha-olefin, phenol/formaldehyde materials, phenoxy material, polyurethane materials with high glass transition temperatures (including polyureas), and mixtures or composites (optionally including solid or porous metals). See also, U.S. Pat. Nos. 5,766,719; 5,755,486; 5,575,526; 5,932,680 (incorporated herein by reference).

Generally speaking, exemplary automotive vehicle applications may utilize technology and processes such as those disclosed in U.S. Pat. Nos. 4,922,596, 4,978,562, 5,124,186 and 5,884,960 and commonly owned, co pending U.S. application Ser. Nos. 09/502,686 filed Feb. 11, 2000, Ser. No. 09/524,961 filed Mar. 14, 2000, 60/223,667 filed Aug. 7, 2000, 60/225,126 filed Aug. 14, 2000, Ser. No. 09/676,443 filed Sep. 29, 2000, Ser. No. 09/676,335 filed Sep. 29, 2000, Ser. No. 09/676,725 filed Sep. 29, 2000, and particularly, Ser. No. 09/459,756 filed Dec. 10, 1999, all of which are expressly incorporated by reference.

In applications where the matrix material is a heat activated material, such as when a thermally melting, expanding, or foaming material is employed, an important consideration involved with the selection and formulation of the material can be the temperature at which the material activates, cures or both. In most applications, it is undesirable for the material to activate at room temperature or the ambient temperature in a production or assembly environment. For automotive applications, it may be desirable for the matrix material to activate at higher processing temperatures, such as those encountered in an automobile assembly plant, when the matrix material is processed along with the automobile components at elevated temperatures. Exemplary temperatures encountered in an automobile assembly body shop oven may be in the range of 148.89° C. to 204.44° C. (300° F. to 400° F.), and paint shop oven temps are commonly about 93.33° C. (215° F.) or higher. If needed, for foaming or expanding type matrix materials, various blowing agent activators can be incorporated into the composition to cause expansion at different temperatures outside the above ranges.

Although many matrix materials may be heat activated, other matrix materials that are activated by another stimuli and are capable of bonding also can be used. Without limitation, such matrix material may be activated by alternative stimuli such as, pressure, chemicals, or by other ambient conditions.

Manufacture

The formation of the reinforcement material 14 and the application of the reinforcement material 14 to the member 12 may be accomplished according to a variety of techniques.

In one preferred embodiment, the portion 24 of strengthening material is positioned (e.g., laminated) as desired between the first portion 20 of matrix material and the second portion 22 of matrix material. As shown, the portions 20, 22 of matrix material are preferably layered on opposing sides of the portion 24 of strengthening material, however, such a configuration is not necessarily required. The portions 20, 22 of matrix material may be at least slightly tacky prior to their activation, cure or both such that the portion 24 of strengthening material can adhere to both portions 20, 22 of matrix material at least until the layers 20, 22 of matrix material are activated. Alternatively, the portions 20, 22 may be substantially non-tacky at about room temperature (e.g., about 20° C.), but may be heated above room temperature to tackify the portions 20, 22 without activating the portions 20, 22 such that the strengthening material can adhere thereto.

A pressure or force is typically applied to the portions 20, 22 of matrix material, urging the portions 20, 22 into intimate contact with the portion 24 of strengthening material and potentially into contact (e.g., through the strengthening material) with each other. In one preferred embodiment, the reinforcement material 14 is formed by continuously extruding the portions 20, 22 of matrix material (e.g., in layers) and continuously applying (e.g., laminating) the portions 20, 22 of matrix material to the portion 24 (e.g., a layer) of strengthening material. In this embodiment it is preferable for one or more rollers to press the portion 20, 22 of matrix material into intimate contact with the portion 24 of strengthening material.

In other alternative embodiments, it is contemplated that the various portions 20, 22, 24 may be applied to each other according to various techniques and protocols, which may be manual or automated. As an example, a technique of hand layup may be used to manually apply the portions 20, 22, 24 to each other.

The thickness of the reinforcement material 14 may range over a wide range and may be continuous or variable. Broadly, the thickness of the reinforcement material may range from as low as 1 millimeter or less to as high as 10 centimeters or more. Preferably, the thickness of the reinforcement material is between about 2 millimeters to about 2 centimeters, more preferably about 4 millimeters to about 1 centimeter and most preferably about 5 millimeters to about 7 millimeters.

Preferably, the portion 24 of strengthening material is no greater than about 50 weight percent of the total weight of the reinforcing material 14, more preferably, no greater than about 40 weight percent of the total weight of the reinforcing material 14 and even more preferably, no greater than about 30 weight percent of the reinforcing material.

Application

As discussed, the reinforcement material 14 may be applied to an article of manufacture (e.g., an automotive vehicle) according to a variety of techniques and protocols. The reinforcement material may be formed by itself and later applied to a surface of a component of an article of manufacture; the reinforcement material may be applied to a surface of a component as the reinforcement material is formed or the reinforcement material may be applied to the surface of a component sequentially in portions. Moreover, the reinforcement material 14 may be applied directly to a surface of a component of an article of manufacture or may be applied to a carrier member and then applied to a component of an article of manufacture.

Release paper may be applied (e.g., laminated) upon either or both of the portions 20, 22 of matrix material preferably while the portions 20, 22 are still in a pre-activated tacky state (e.g., shortly after extrusion). In one preferred embodiment, a surface of the portion 20, 22 of matrix material covered by the release paper remains protected and at least partially tacky such that the release paper may be removed and the reinforcement material 14 may be applied to a surface of the member 12 whether the member is a carrier member or a component of an automotive vehicle.

In one preferred embodiment, one of the portions 20, 22 are applied to (e.g., contacted with) the member 12 in a solid or semi-solid state. However, portions 20, 22 may be applied to the member 12 in a fluid state using commonly known manufacturing techniques. In the preferred embodiment, the matrix material may be heated to a temperature that permits it to flow slightly to aid in wetting a surface of the member 12. Alternatively, the matrix material may also be applied by heat bonding/thermoforming or by co-extrusion. As still another alternative, the portions 20, 22 of matrix material may be substantially solid and non-tacky upon application to a member, particularly where the reinforcement material is to be inserted in a cavity, with or without a carrier member.

As discussed, the member 12 to which the reinforcement material 14 is applied may be a component of an article of manufacture or a carrier member. In instances where a carrier member is used, the reinforcement material 14 is typically applied to the carrier member followed by application of the reinforced carrier member to a component of an article of manufacture (e.g., insertion of the reinforced member into a cavity of a body of an automotive vehicle).

If employed, the carrier member is preferably a skeleton or other member adapted for stiffening the structure to be reinforced and helping to redirect applied loads. In particular preferred embodiments, the member could be an injection molded nylon carrier, an injection molded polymer, or a molded metal (such as aluminum, magnesium, and titanium, an alloy derived from the metals, and even a metallic foam). Still further, the member adapted for stiffening the structure to be reinforced could comprise a stamped and formed cold-rolled steel, a stamped and formed high strength low alloy steel, a stamped and formed transformation induced plasticity (TRIP) steel, a roll formed cold rolled steel, a roll formed high strength low alloy steel, or a roll formed transformation induced plasticity (TRIP) steel.

For forming the reinforced members, either with a carrier member or without, the reinforcement material is typically activated and/or cured to stiffen the reinforcement material and, in turn, impart structural rigidity to the member being reinforced. Activation may be induced by a variety of stimuli such as moisture, chemicals, heat or the like and curing may also be induced by a variety of stimuli such as time, cooling or the like.

The reinforcement material 14 and, in particular, the matrix material preferably expands upon activation and hardens upon curing such that the portions 20, 22 in combination with the portion 24 of strengthening material can provide added structural integrity to the member 12.

The matrix material may be induced to flow slightly upon activation to wet a surface of the member 12 allowing the material to adhere, and/or reactively bond to the surface of the member 12, to the portion 24 of strengthening material or both upon curing. In embodiments wherein the member 12 is a carrier member, the portions 20, 22 of matrix material preferably expand to contact and wet adjacent surfaces of a component of an article of manufacture and a surface of the carrier to adhere, and/or reactively bond with those surfaces upon curing.

In one embodiment, the reinforcement material 14 is applied to an automotive vehicle and the matrix material is activated during an automotive bake cycle. In the preferred embodiment wherein reinforcement material is comprised portions 20, 22 of matrix material and the portion 24 of strengthening material, the reinforcement material 14, upon activation thereof, preferably wets the portion 24 of strengthening material to promote integration of the strengthening material with the matrix material. In one embodiment, the wetting of the strengthening material can be advantageously enhanced by foaming or bubbling of the matrix material, which can enhance the integration of the strengthening material into the matrix material. Preferably, the integration of the strengthening material with the matrix material increases the strength of the reinforcement material 14 such that the reinforcement material 14 has a strength greater than the sum of the strength of the matrix material and the strengthening material taken individually.

It is contemplated within the present invention that the reinforcement material may be provided as a combination of a matrix material and a fiberglass woven roving, which are disclosed in commonly owned U.S. patent application Ser. No. 09/939,152, titled "Structurally Reinforced Panels" and fully incorporated herein by reference for all purposes. Moreover, it is further contemplated that the reinforcement material of the present invention may be used in conjunction with a buffer layer as described in commonly owned U.S. Patent Application, attorney docket no. 1001-090, also titled "Structurally Reinforced Panels" and fully incorporated herein by reference for all purposes In the embodiment disclosed, the reinforcement material 14 may be applied to panel portions of an automotive vehicle, which may be included in, without limitation, front and rear quarter panels, door panels, floor pans, floor panels, roof panels, hood panels, trunk panels and the like as well as other portions of an automotive vehicle which may be adjacent to the interior of exterior of the vehicle to form a reinforced panel. The reinforcement material may also be inserted within an opening of a member. As another alternative, the reinforcement material may also be applied to a carrier member and the carrier member may be placed within a cavity of an automotive vehicle. Cavities or openings within a vehicle may be at least partially defined by members or portions of the vehicle such as doors, frame members, body members, pillars (e.g., A, B, or C-pillars) or the liked.

Figure 2:
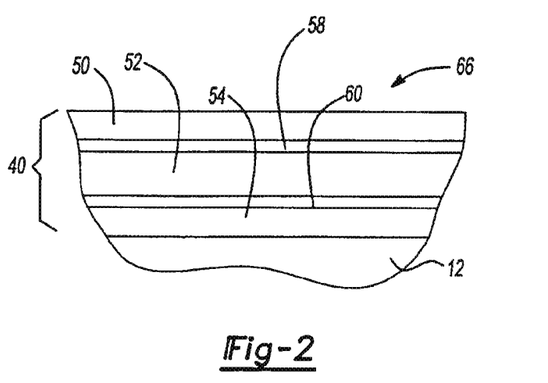
FIG. 2 is sectional view of an alternative reinforcement material applied to a member according to another exemplary aspect of the present invention.

Referring to FIG. 2, it is contemplated within the present invention that more than two matrix portions (e.g., 3, 4 or 5 portions) may be used with more than one portion of strengthening material (e.g., 2 or 3 portions). In FIG. 2 there is illustrated a reinforcement material 40 with three portions 50, 52, 54 (e.g., layers) of matrix material and two portions 58, 60 (e.g., layers) of strengthening material integrated therebetween. As shown, the reinforcement material 40 is applied to the same member 12 as in FIG. 1 for forming a structurally reinforced member 66.

In one embodiment of the invention, the reinforcement material is sized to fit within a relatively small opening (e.g., cavity) of a member. As used herein, a relatively small opening is defined as an opening having one or more relatively small dimensions (e.g., cross-sectional dimensions). Preferably, such relatively small dimensions are less than about 50 millimeters, more preferably less than about 40 millimeters, still more preferably less than about 30 millimeters.

For insertion into such a relatively small opening, the reinforcement material typically has one or more corresponding relatively small dimensions (e.g., cross-sectional dimensions) for allowing the reinforcement material to fit into the relatively small opening. The one or more relatively small dimensions of the reinforcement material are typically within 30 millimeters, more preferably within 20 millimeters and even more preferably within 10 millimeters of the one or more relatively small dimensions of the relatively small opening. The one or more relatively small dimensions of the matrix material preferably extend substantially entirely through each portion (e.g., layer) of matrix material and each portion (e.g., layer) of strengthening material of the reinforcement material. It is also preferable that, upon insertion, the one or more relatively small dimensions of the reinforcement material substantially correspond to, or align with the one or more relatively small dimensions of the relatively small opening to allow the reinforcement material to fit within the relatively small opening.

Figure 3:
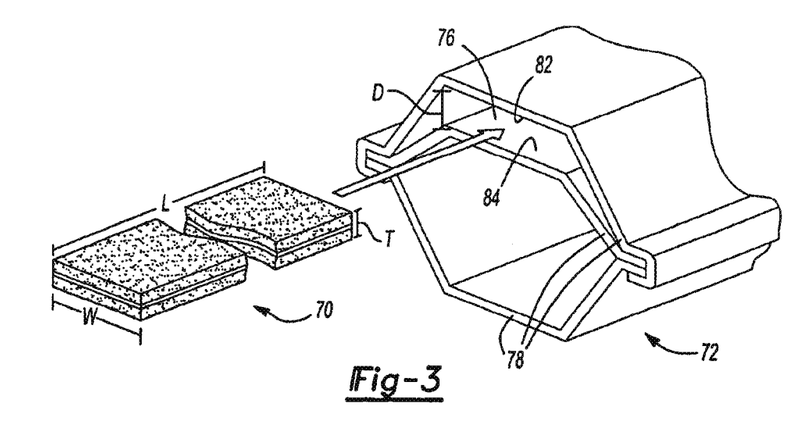
FIG. 3 is a perspective view of a reinforcement material being applied to a member according to another exemplary aspect of the present invention.
Figure 4:
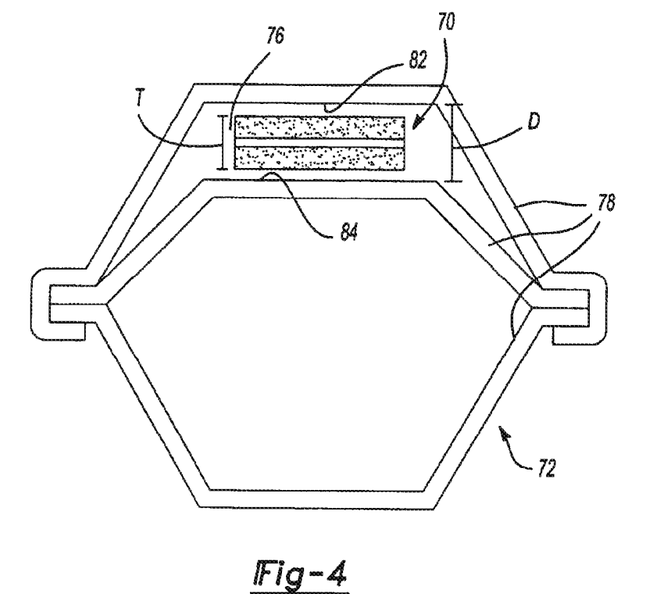
FIG. 4 is a sectional view of the member of FIG. 3 with the reinforcement material applied thereto in an unexpanded state.

Referring to FIGS. 3 and 4, there is illustrated a reinforcement material 70 similar to the reinforcement materials 14, 40 of FIGS. 1 and 2, but which could be any of the reinforcement materials described herein. The reinforcement material 70 is inserted into a member 72 having a relatively small opening 76 suitable for receiving the reinforcement material 70. For exemplary purposes, the member 72 is shown as a pillar of an automotive vehicle that is comprised of multiple walls 78 attached together in opposing relation to each other. It is contemplated, however, that the member may be any member described herein or otherwise.

The reinforcement material 70 is configured as an elongated strip of layers (i.e., layers of matrix material and strengthening material) and has various dimensions such as a length (L), a width (W) and a relatively small dimension, which is a thickness (T). Of course, it is contemplated that these dimensions may be different for differently shaped reinforcement materials. The opening 76 also includes a relatively small dimension, which is a distance (D) that extends from an inner surface 82 of one wall 78 to an inner surface 84 of another wall 78. As shown, the distance (D) extends substantially perpendicular to both surfaces 82, 84, although not required.

Upon placement of the reinforcement material 70 within the relatively small opening 76, the thickness (T) of the reinforcement material 70 is substantially parallel to or in alignment with the distance (D) of the opening 76. Generally, such alignment or parallel relation allows the reinforcement material 70 to fit within the opening 76 where a reinforcement material having a larger dimension (i.e., a larger thickness) would not be able to fit.

Figure 5:
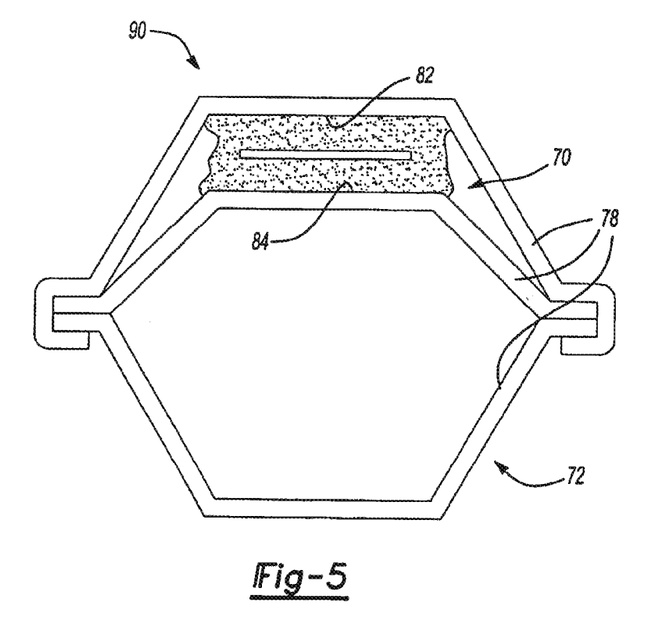
FIG. 5 is a sectional view of the member of FIG. 3 with the reinforcement material applied thereto in an expanded state.

Referring to FIG. 5, the reinforcement material 70 is activated to expand, contact and, upon curing, to adhere to the surfaces 82, 84 of the walls 78 of the member 72 thereby forming a structurally reinforced member 90. In operation, the reinforcement material 70 provides strength to the member 72 thereby increasing the resistance of the structurally reinforced member 90 to deformation. In particular, it has been found that the structurally reinforced member 90 exhibits improved resistance to bending moments, and more specifically, bending moments that are at least partially applied in directions substantially parallel to the relatively small dimension (i.e., the thickness (T)) of the reinforcement material and/or the relatively small dimension (i.e., the distance (D)) of the opening 76.

Advantageously, the reinforcement materials of the present invention have shown greater reinforcing abilities than matrix material alone. Moreover, when high stiffness fibers such as glass fibers are used as the strengthening material, the reinforcement materials have shown substantially equivalent or greater reinforcing abilities when compared to reinforcement materials that use much heavier materials (e.g., metal materials) for reinforcing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of reinforcing a structure of an automotive vehicle, the method comprising:
   providing at least two portions of a matrix material with at least one portion of a strengthening material between and directly contacting the at least two portions of the matrix material thereby forming a reinforcement material, the reinforcement material having a length, a width, and a thickness, the thickness extending through the at least two portions of the matrix material and through the at least one portion of the strengthening material, the thickness being less than 30 millimeters, the strengthening material being a metal sheet sheet, wherein the at least two portions of the matrix material include an epoxy-based material, and wherein the strengthening material extends substantially entirely in directions parallel to the width and length, and the width and length are perpendicular to the thickness;
   providing a structure of an automotive vehicle, the structure defining a cavity and comprising a plurality of walls and at least one small opening having a dimension that is less than 10 mm greater than the thickness of the reinforcement material into which the reinforcement material can be inserted, the at least one small opening extending from an inner surface of a first wall of the structure to an inner surface of a second opposing wall of the structure, the second opposing wall being in an opposing relationship with a third wall within the cavity;
   locating the reinforcement material within the at least one small opening within the cavity of the structure of the automotive vehicle
   activating the reinforcement material to expand and adhere to a surface of the structure thereby providing structural integrity to the structure of the automotive vehicle, the surface of the structure at least partially defining the cavity of the structure.

2. A method as in claim 1, wherein the reinforcement material is provided as a strip.

3. A method as in claim 1, wherein the structure is a pillar of the automotive vehicle.

4. A method as in claim 1, wherein the thickness is between about 4 millimeters to about 1 centimeter.

5. A method as in claim 1, wherein the thickness and the dimension are less than 20 millimeters.

6. A method as in claim 1, wherein the reinforcement material expands without filling a cross-section of the at least one small opening.

7. A method as in claim 1, wherein the reinforcement material includes a first surface that extends in directions parallel to the length and width of the reinforcement material and that, upon insertion of the reinforcement material within the at least one small opening within the cavity, substantially opposes ire surface of the structure.

8. A method of reinforcing a structure of an automotive vehicle, the method comprising:
   providing at least two portions of a matrix material with at least one portion of a strengthening material between and directly contacting the at least two portions of the matrix material thereby forming a reinforcement material, the reinforcement material having a length, a width, and a thickness, the thickness extending through the at least two portions of the matrix material and through the at least one portion of the strengthening material, the thickness being less than 30 millimeters, the strengthening material is a metal sheet, wherein the at least two portions of the matrix material are substantially non-tacky at room temperature, wherein the at least two portions of the matrix material include an epoxy-based material, and wherein the strengthening material extends substantially entirely in directions parallel to the width and length, and the width and length are perpendicular to the thickness;
   applying the reinforcement material to a carrier member, the carrier member being formed of a metal;
   providing a structure of an automotive vehicle, the structure defining a cavity and comprising a plurality of walls and at least one small opening having a dimension that is less than 10 mm greater than the thickness of the reinforcement material into which the reinforcement material can be inserted, the at least one small opening extending from an inner surface of a first wall of the structure to an inner surface of a second opposing wall of the structure, the second opposing wall being an opposing relationship with a third wall within the cavity;
   locating the carrier member into the at least one small opening within the cavity of the structure of the automobile vehicle; and
   activating the reinforcement material to expand and adhere to a surface of the structure thereby providing structural integrity to the structure of the automotive vehicle, the surface of the structure at least partially defining the cavity of the structure.

9. A method as in claim 8, wherein the reinforcement material is provided as a strip.

10. A method as in claim 8, wherein the structure is a pillar of the automotive vehicle.

11. A method as in claim 8, wherein the thickness is between about 4 millimeters to about 1 centimeter.

12. A method as in claim 8, wherein the thickness and the dimension are less than 20 millimeters.

13. A method as in claim 8, wherein the reinforcement material expands without filling a cross-section of the at least one small opening.

14. A method as in claim 8, wherein the reinforcement material includes a first surface that extends in directions parallel to the length and width of the reinforcement material and that, upon insertion of the reinforcement material within the at least one small opening within the cavity, substantially opposes the surface of the structure.

15. A method of reinforcing a structure of an automotive vehicle, the method comprising:
providing at least two portions of a matrix material;
positioning at least one portion of a strengthening material between and directly contacting the at least two portions of the matrix material thereby forming a reinforcement material, the reinforcement material being provided as a strip having a length, a width, and a thickness, the thickness extending through the at least two portions of the matrix material and through the at least one portion of the strengthening material, the strengthening material is a metal sheet, wherein the at least two portions of the matrix material are substantially non-tacky at room temperature, and wherein the at least two portions of the matrix, material include an epoxy-based material, wherein the strengthening material extends substantially entirely in directions parallel to the width and length, and the width and length are perpendicular to the thickness, the thickness is between about 4 millimeters to about 1 centimeter, wherein the reinforcement material includes a first surface that extends in directions parallel to the length and width of the reinforcement material and that, upon insertion of the reinforcement material within the cavity, substantially opposes the surface of the structure;
applying the reinforcement material to a carrier member, the carrier member being formed of a metal;
providing a structure of an automotive vehicle, the structure defining a cavity and comprising a plurality of walls and at least one small opening having a dimension that is less than 10 mm greater than the thickness of the reinforcement material into which the reinforcement material can be inserted, the at least one small opening extending from an inner surface of a first wall of the structure to an inner surface of a second opposing wall of the structure, the second opposing wall being in an opposing relationship with a third wall within the cavity;
locating the carrier member into the at least one small opening within the cavity of the structure of the automobile vehicle;
activating the reinforcement material to expand and adhere to a surface of the structure thereby providing structural integrity to the structure of the automotive vehicle, the surface of the structure at least partially defining the cavity of the structure, wherein the reinforcement material expands without filling a cross-section of the small opening.

16. A method as in claim 6, wherein the epoxy based material has a glass transition temperature greater than about 50 degrees Celsius.

17. A method as in claim 15, wherein the portion of the strengthening material is no greater than about fifty weight percent of the total weight of the reinforcing material.

18. A method as in claim 15, wherein the at least two portions of the matrix material include at least three portions of the matrix material, and the at least one portion of the strengthening material includes at least two portions of the strengthening material.

* * * * *

UNITED STATES PATENT AND TRADEMARK OFFICE
CERTIFICATE OF CORRECTION

PATENT NO. : 8,580,058 B2
APPLICATION NO. : 11/944075
DATED : November 12, 2013
INVENTOR(S) : Czaplicki et al.

It is certified that error appears in the above-identified patent and that said Letters Patent is hereby corrected as shown below:

On the Title Page
References Cited
OTHER PUBLICATIONS
Page 1
Delete
"Born el al., Structural Bonding in Automotive Applications."
Page 4
Delete
"Hopton et al., Application of a Structural Reinforcing Material to Improve Vehicle NVH Characteristics"
"Lilley et al., Comparison of Preformed Acoustic Baffles and Two-Component Polyurethane Foams for Filling Body Cavities."
"Lilley et al., A Comparison of NVH Treatments for Vehicle Floorplan Application"
"Lilley et al., Vehicle Acoustic Solutions."
"Mansour et al., Optimal Bonding Thickness for Vehicle Stiffness."
"Klein et al., Application of Structural Foam in the Body in White."

In the Claims
Col. 9, Claim 1, Line 38, Delete "being a metal sheet sheet" and insert --being a metal sheet,--
Col. 10, Claim 8, Line 41, Insert --in-- after "second opposing wall being"
Col. 11, Claim 15, Line 15, Delete "," in between "matrix" and "material"

Signed and Sealed this
Eleventh Day of March, 2014

Michelle K. Lee
*Deputy Director of the United States Patent and Trademark Office*